United States Patent [19]

Hirasawa et al.

[11] Patent Number: 4,562,478

[45] Date of Patent: Dec. 31, 1985

[54] LIQUID CRYSTAL TELEVISION RECEIVER

[75] Inventors: Yukinori Hirasawa; Osamu Kameda, both of Tokyo, Japan

[73] Assignee: Casio Computer Co., Ltd., Tokyo, Japan

[21] Appl. No.: 466,209

[22] Filed: Feb. 14, 1983

[30] Foreign Application Priority Data

Feb. 18, 1982 [JP] Japan ................... 57-25144

[51] Int. Cl.[4] ................ H04N 5/70; G02F 1/135; G02F 1/19
[52] U.S. Cl. .................. 358/236; 340/784; 350/338
[58] Field of Search ........... 340/784, 765; 358/236; 350/338; 315/169.3

[56] References Cited

U.S. PATENT DOCUMENTS 4,462,027  6/1984  Lloyd et al. ................ 340/784

FOREIGN PATENT DOCUMENTS

| 0000897 | 1/1979 | Japan | 340/765 |
| 0040586 | 3/1979 | Japan | 315/169.3 |
| 7904883 | 12/1980 | Netherlands | 350/338 |
| 1273779 | 5/1972 | United Kingdom . |
| 1276523 | 6/1972 | United Kingdom . |
| 1395241 | 5/1975 | United Kingdom . |
| 1521724 | 8/1978 | United Kingdom . |
| 1547598 | 6/1979 | United Kingdom . |

OTHER PUBLICATIONS

Kokado et al., A Pocketable L C Television Receiver, Aug. 1981, IEEE Trans., vol. CE-27, No. 3.
Young, Combination Reflective/Transmitive LC Display, Jan. 1973, IBM Technical Disclosure Bulletin, vol. 15, No. 8.

*Primary Examiner*—Tommy P. Chin
*Attorney, Agent, or Firm*—Frishauf, Holtz, Goodman and Woodward

[57] ABSTRACT

Within a case a main television circuit, a liquid crystal display panel for producing an image on a front side thereof, an EL light illuminating panel and a driving circuit which is driven to cause said EL light illuminating panel to emit light are accommodated. The EL light illuminating panel is mounted on the reverse side of said crystal display panel so as to emit light through and out of the front side of the panel.

11 Claims, 15 Drawing Figures

LIQUID CRYSTAL TELEVISION RECEIVER

BACKGROUND OF THE INVENTION

The present invention relates to improvements in a liquid crystal television receiver.

Recently a liquid crystal television receiver using a liquid crystal display panel has been developed.

The liquid crystal display panel conventionally used is a display panel of the so-called "reflection type" in which a reflection panel is provided on the reverse side of the panel, and is used to display the picture image on the front side of the panel by utilizing light from the outside.

However, while the liquid crystal display panel of this type can display images with good contrast in bright places where sufficient incident light can be obtained, in the dark, because of the reduction in contrast, the displayed image cannot be distinguished clearly. Thus, in the liquid crystal television receiver of this type, there is a disadvantage in that in dark places where incident light from the outside cannot be obtained, the receiver will not perform well.

SUMMARY OF THE INVENTION

It is an object of the present invention to eliminate the above-described disadvantage and to provide a liquid crystal television receiver which can display an image of good contrast without being influenced by outside brightness.

In order to attain the above-described object the liquid crystal television receiver according to the present invention comprises a main television circuit means; a liquid crystal display panel means; a light illuminating panel means disposed at a predetermined distance from, and facing, the reverse side of said liquid crystal display panel; a driving circuit means connected to said light illuminating panel for driving said light illuminating panel to emit light; and a case for accommodating said main television circuit, said liquid crystal display panel, said light illuminating panel and said driving circuit.

Because of the above-mentioned construction, the light illuminating panel is adapted so as to emit light from the reverse side thereof so as to illuminate itself, so that this liquid crystal display panel can display images of good contrast even in dark places. Further, the driving circuit for driving the light illuminating panel operates only when a tuning detection signal is input. Therefore, when tuning is shifted to other channels, that is, when no image is displayed, the light emission function of the illuminating panel can be stopped to save electric power. Thus, according to the present invention it is possible to provide a novel liquid crystal television receiver having several advantages as described above.

DETAILED DESCRIPTION OF THE PREFERRED EMBODIMENTS

Figure 1:
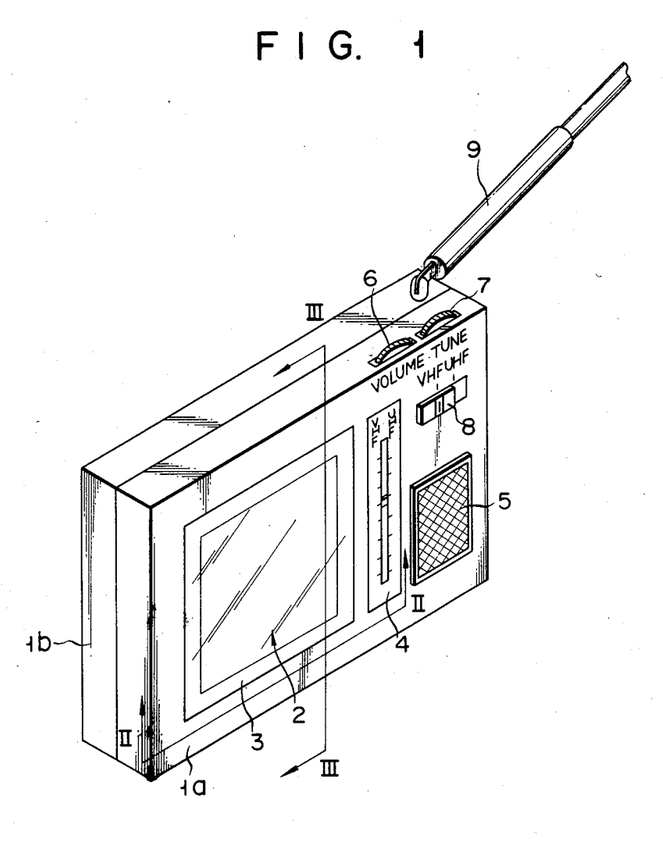
FIG. 1 is a view showing the external appearance of a liquid crystal television receiver according to the present invention.
Figure 2:
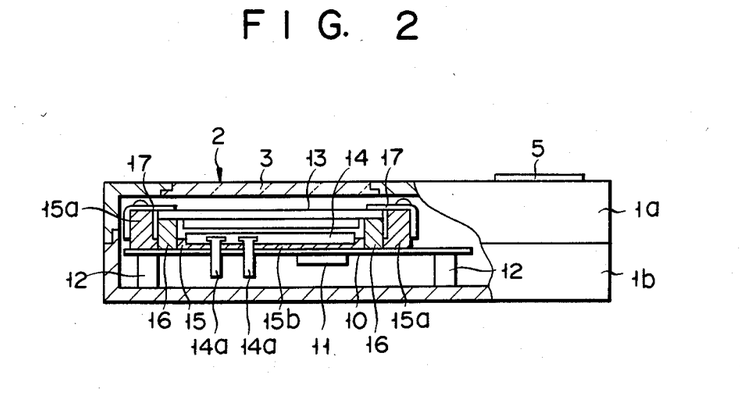
FIG. 2 is a partially sectional view of the liquid crystal television receiver cut along line II—II of FIG. 1 and seen in the direction shown by an arrow.
Figure 3:
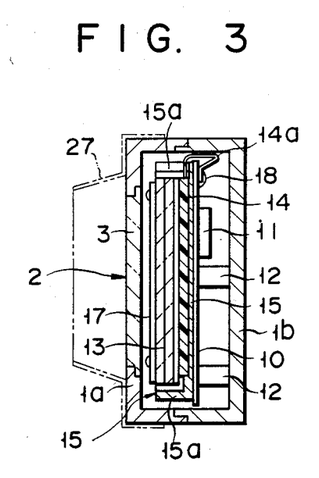
FIG. 3 is a sectional view of the liquid crystal television receiver cut along line III—III and seen in the direction shown by an arrow in FIG. 1.

FIGS. 1 to 3 show a front side case 1a and a reverse side case 1b, and on the front surface of the front side case 1a there are provided a display window 2 in which a plate glass (or a transparent plastic plate) 3 is fitted, a channel displaying portion 4 and a speaker part 5. In addition a volume adjusting dial 6 also serves as a switch for the electric power source, a VHF-UHF change-over switch 8 and an antenna 9 are provided.

In FIGS. 2 and 3 a circuit substrate 10 is mounted between both the side cases 1a and 1b parallel to the front surface of the case, and an LSI 11 is fitted on the reverse side of the circuit substrate 10. The circuit substrate 10 is fixed to supporting legs 12, 12 provided in the reverse side case 1b by means of securing means such as screws or the like (not shown).

Thus, a liquid crystal display for displaying images on a television receiver is provided between the circuit substrate 10 and the display window 2. This liquid crystal display for displaying images on the television receiver comprises a dot-matrix liquid crystal display panel 13 of twist nematic type and an electroluminescent light illuminating panel 14 (hereinafter referred to as the EL light illuminating panel) having an area substantially equal to the displaying area of the liquid crystal display panel 13 on the reverse side of the crystal display panel 13.

A display supporting frame 15 is attached on the front surface of the circuit substrate 10 and fixed with fixing means such as screws or the like, and the supporting frame 15 is a flat plate member having a raised wall 15a at the periphery thereof. The aforementioned EL light illuminating panel 14 is fixedly fitted to a flat plate portion 15b thereof with an adhesive means such as a tape on which both sides are applied with an adhesive or the like.

The liquid crystal display panel 13 is also supported by interconnectors 16, 16 which penetrate the flat plate portion 15b of the supporting frame 15 and are held between the circuit substrate 10 and a portion at which terminals of the liquid crystal display panel 13 are arranged, and further at the same time the liquid crystal display panel 13 is fixed by pressing both side portions thereof from the front side with panel pressing members 17, 17 secured to the raising wall 15a of the support frame 15.

The aforementioned EL light illuminating panel 14 is a material which utilizes a fluorescent substance which emits fluorescent light when an electric field is applied thereto, and comprises a condensor formed by inserting a layer of dielectric material which includes the aforementioned fluorescent substance between a transparent overall plane electrode and another overall plane electrode oppositely disposed to the transparent one, and is adapted to emit fluorescent light when an AC voltage is applied between both electrodes.

Zinc sulfide, zinc selenous sulfide, zinc selenous sulfratum cadmium, etc., may be used as the fluorescent substances, and according to the selection of these fluorescent substances, any desired colored light can be obtained. Terminals 14a, 14a of this EL light illuminating panel 14 are, as shown in FIG. 3, contacted with terminal electrodes (not shown) on the reverse surface of the circuit substrate 10 by detouring about the side edge of the circuit substrate 10 and may be secured thereto by soldering, if necessary.

Figure 4:
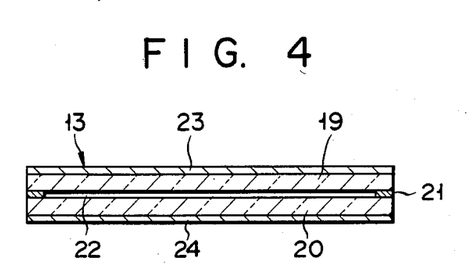
FIG. 4 is a sectional view of the liquid crystal display panel shown in FIGS. 2 and 3.

On the dot-matrix liquid crystal display panel 13 of twist nematic type, as shown in FIG. 4, polarizers 23 and 24 are provided on both side surfaces of a cell vessel which is made by attaching a pair of transparent substrates 19 and 20 through a frame-like seal material 21 and fitted by nematic liquid crystal 22. On one of the pair of substrates 19 and 20 a scanning electrode is formed and on the other thereof a signal electrode is made. In addition, on the surfaces of both substrates 19 and 20 an orienting process for arranging molecules of liquid crystal into twist arrangement is carried out.

Figure 5:
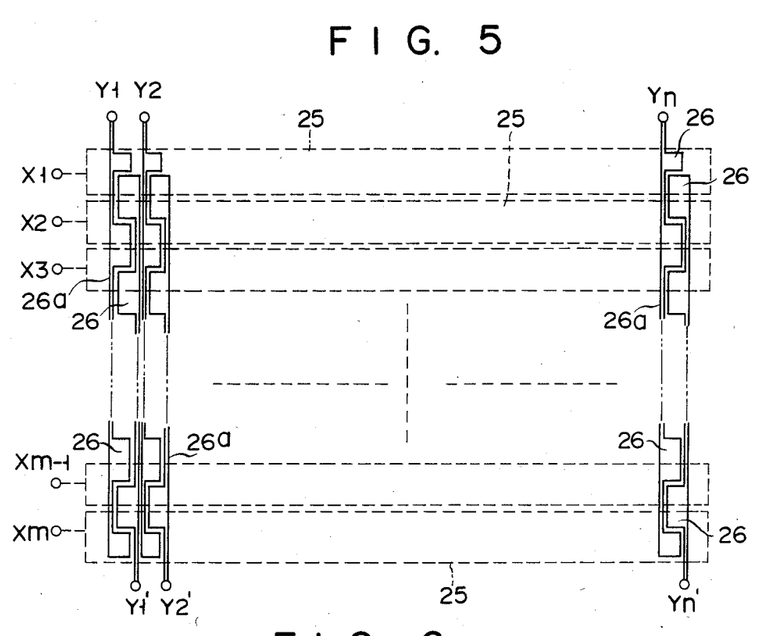
FIG. 5 is a schematic view showing construction of each of the scanning electrodes for display and signal electrodes mounted on respective substrates of the liquid crystal display panel.
Figure 6:
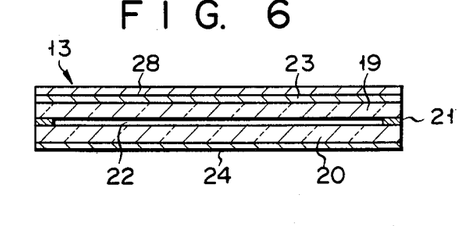
FIG. 6 is a sectional view showing one of the other embodiments of the liquid crystal display panel.

In FIG. 5 an example of the scanning electrode and the signal electrode is shown, and this is an example of the electrodes of double matrix type. In the figure the scanning electrodes 25, 25 formed on one of the substrates are shown by a broken line and the signal electrodes 26, 26 formed on the other substrate are shown by solid lines. Lead lines 26a, 26a of the signal electrodes 26, 26 are provided $X_1, X_2, X_3, \ldots, X_{m-1}, X_m$ are terminals of the scanning electrode. $Y_1, Y_2, Y_3, \ldots, Y_n$ and $Y'_1, Y'_2, \ldots, Y'_n$ are terminals of the signal electrodes.

In the television receiver provided with a liquid crystal display for displaying images comprising the dot-matrix liquid crystal display panel 13 of twist nematic type and the EL light illuminating panel 14 disposed facing the reverse side of the panel 13, when a voltage is applied to the EL light illuminating panel 14, the EL light illuminating panel 14 emits light to illuminate the whole display area of the liquid crystal display panel 13 uniformly from the reverse side. When light is emitted from the EL light illuminating panel 14 by driving the driving circuit, the liquid crystal display panel 13 can be illuminated, so that whether the viewing environment is dark or bright, a proper image display by the liquid crystal display panel 13 can be attained.

In addition, by selecting a suitable voltage to be applied to the EL light illuminating panel 14 so that the brightness of light emission of the EL light illuminating panel 14 may be sufficient for illuminating the liquid crystal display panel 13, an image of good contrast can be obtained.

Figure 7:
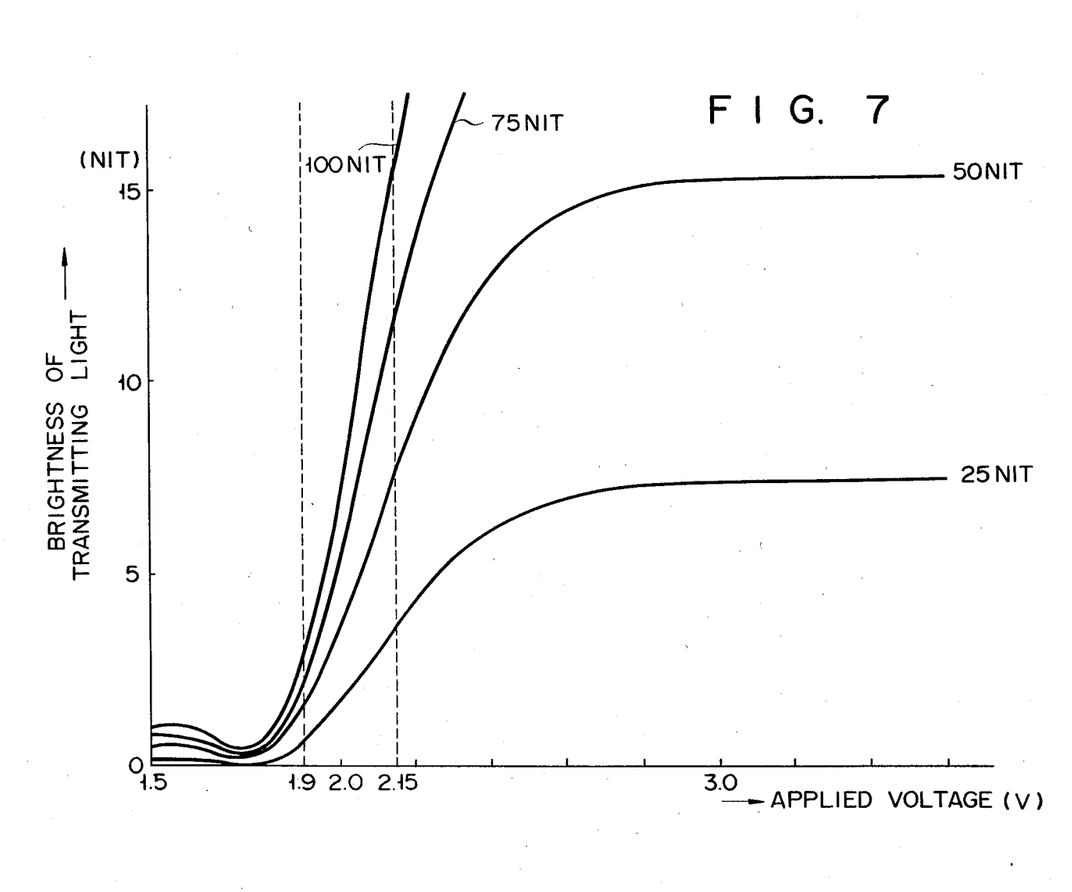
FIG. 7 is a graph which illustrates the relationship between the applied voltage to the light illuminating panel and the contrast of the image.

The relationships represented by making the brightness of the EL light illuminating panel as a parameter between the effective voltage applied to the liquid crystal and the contrast of the image displayed are shown in FIG. 7. That is, from the figure it can be seen that a difference in an amount of transmission light, for example, between 1.9 V and 2.15 V between which the effective applied voltage varies such that, the brightness of the EL light illuminating panel 14 being 100 Nit contrast of the displayed image is much better than the brightness of the panel 14 being 25 Nit, and thus a better contrast is obtained.

Further, in a conventional display of the reflection type, because of double light losses occurring in the light passing process in the liquid crystal display panel, considerable incident light was necessary to ensure displaying contrast of the liquid crystal panel; however, in the display of this embodiment according to the present invention, since the liquid crystal display panel 13 is illuminated from the reverse surface, light loss on the liquid crystal display panel 13 is about ½ that of the conventional display of the reflection type.

Accordingly, necessary light emission brightness of the EL light illuminating panel 14 is considered to be about ½ of the brightness of incident light necessary for the conventional display of the reflection type, so that the voltage to be applied to the EL light illuminating panel 14 may be relatively low.

It is also possible to utilize a light emitting diode as a light illuminating panel, however, an electroluminescent light illuminating panel excels in being able to obtain uniform light emission over the whole surface of the panel, consuming less power, being low in cost, being thinner, etc. than a light illuminating panel which utilizes a light emitting diode.

In the EL light illuminating panels 14 there are various kinds of light illuminating panels which emit not only white light but also various colored lights (the color of the emitted light being decided by the fluorescent substances being used), so that, according to the display of this embodiment, by selecting the EL light illuminating panel 14, it is possible to display not only black and white images but also single color displays such as black-blue displays by using a blue color light illuminating panel and black-green display, by using a green color light illuminating panel, etc.

Figure 8:
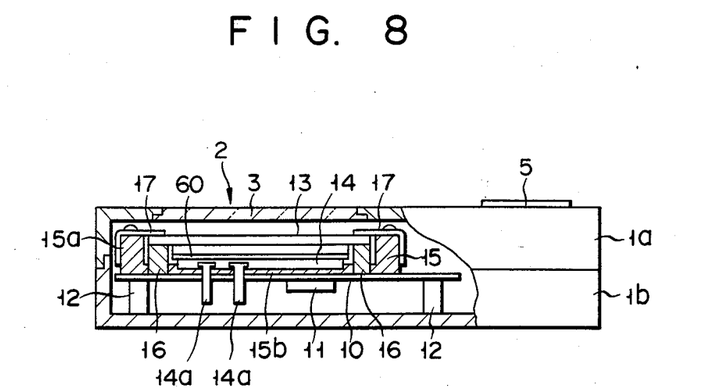
FIG. 8 is a partially sectional view of the other embodiment of the liquid crystal television receiver according to the present invention cut along line II—II shown in FIG. 1.
Figure 9:
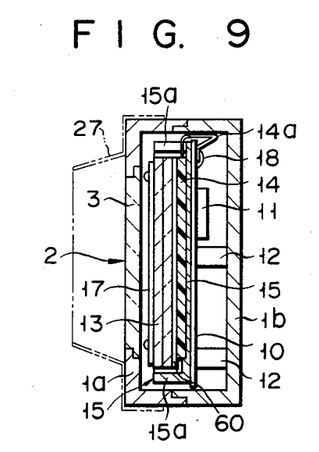
FIG. 9 is a partially sectional view of the embodiment shown in FIG. 8 cut along line III—III shown in FIG. 1.

In the above-described embodiment of the present invention, images are to be displayed only by light illumination generated within the EL light illuminating panel 14 without utilizing any light from the outside. Of course, even in the display of the conventional reflection type it is possible to obtain a good display in a bright place, so that, as shown in FIGS. 8 and 9, between the liquid crystal display panel 13 and the electroluminescent light illuminating panel 14, a half mirror 60 (reflection plate of the half-transmission type) may be provided for utilizing available light from the outside without using the electroluminescent light illuminating panel 14. The constructions shown in FIGS. 1, 2 and 3 are designated by identical reference numbers used in FIGS. 8 and 9, and the descriptions therefor are omitted.

However, when the half mirror 60 is provided, if the incident light from the outside is brighter than the light from the panel 14, the light from the panel 14 scarcely passes through the half-mirror 60. It is therefore impossible to display single color images by using colored light of the EL light illuminating panel 14 in a bright place. However, as shown by the two-dot chain line in FIG. 9, if a shielding light hood 27 which surrounds the display window 2 is fitted to the television receiver to reduce incident light from the outside, it is possible to display a single color image by utilizing colored light of the light illuminating panel 14 even in a bright place.

Figure 10:
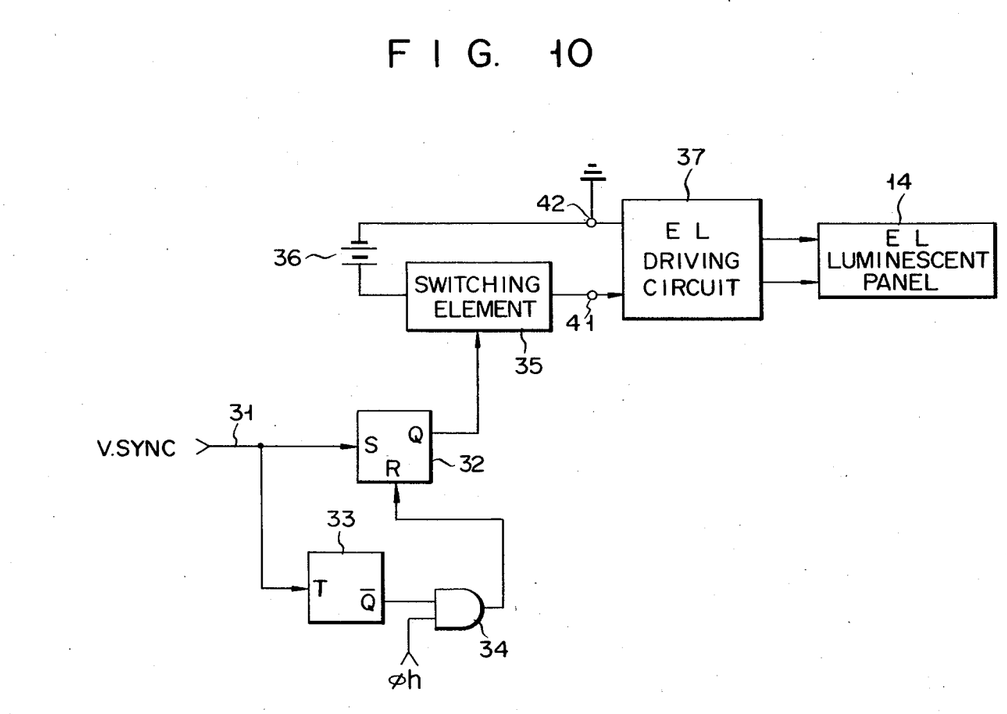
FIG. 10 is a circuit diagram showing a drive controlling section of an EL light illuminating panel in the present invention.

Thus, drive control of the EL light illuminating panel 14 is carried out by a control circuit shown in FIG. 10. That is, in FIG. 10 a signal line 31 is provided to which line a vertical synchronizing signal V.SYNC separated from the video signal in a vertical synchronizing signal separation circuit in the main television circuit (not shown) is given.

The vertical synchronizing signal V.SYNC given to the signal line 31 is input to a set terminal R of an R-S flip-flop 32 and also input to a trigger terminal T of a re-triggerable multivibrator 33. Output time width of the multivibrator 33 is set sufficiently longer than the period of the vertical synchronizing signal V.SYNC, and output of the $\overline{Q}$ side thereof is input together with a timing signal $\phi_h$ of a predetermined time width to an AND circuit 34.

The output of the AND circuit 34 is sent to the flip-flop 32 as a reset signal. Then, the output of the Q side of the flip-flop 32 is fed to a switching element 35 as an ON/OFF control signal. The switching element 35 is disposed between a DC electric power source 36 comprised of batteries and raised to 100 V, and the EL driving circuit 37, and controls power supply to the EL driving circuit 37 ON/OFF switching operation. The EL driving circuit 37 is adapted to drive the EL light illuminating panel 14 when the DC electric power source 36 is supplied, according to the alternating current flow, synchronizing with the clock pulse. The operation of the EL driving circuit 37 will be described in detail hereinafter.

In FIG. 10, when the main television circuit is tuned to a television signal a vertical synchronizing signal V.SYNC is fed to the signal line 31 from the main television circuit, and the flip-flop 32 is set to output "1". According to the aforementioned operation the switching element 35 is turned to the on-state, and the DC power source 36 begins to supply power to the EL driving circuit 37.

This EL driving circuit 37 drives, when it is supplied with power from the DC power source 36, the EL light illuminating panel 14 to emit light in synchronism with the clock pulse. By means of the light emission of the EL light illuminating panel 14, the picture plane of the television receiver is displayed by a single color.

On the other hand, the vertical synchronizing signal V.SYNC fed to the signal line 31 is input to the re-triggerable multivibrator 33 to trigger it. The output time width of this re-triggerable multivibrator 33 is set, as mentioned above, sufficiently longer than the synchronizing time of the vertical synchronizing signal V.SYNC, so that, during the period while vertical synchronizing signal V.SYNC is fed thereto normally, the triggered state is maintained.

The multivibrator 33 holds the "0" output state at its $\overline{Q}$ side, while it is held in the triggered state, and closes the gate of the AND circuit 34. Accordingly, even though the timing signal $\phi_h$ is given to the AND circuit 34, the output of the A1D circuit 34 is held to "0", and the flip-flop 32 is not reset. As a result, while the vertical synchronizing signal V.SYNC is normally fed thereto, the EL light illuminating panel 14 is driven to emit light. Thus, when the EL light illuminating panel 14 is driven to emit light as mentioned the above, if the vertical synchronizing signal V.SYNC is not fed to the signal line 31 while tuning is not being carried out, the multivibrator 33 returns to a stable state, and output of the $\overline{Q}$ side thereof turns to "1" and is input to the AND circuit 34.

Accordingly, when timing signal $\phi_h$ is input to the AND circuit 34, the output of the AND circuit 34 becomes "1", and the flip-flop 32 is reset. Because of this operation, the output of the flip-flop 32 becomes "0" to let the switching element 35 turn off. The switching element 35 cuts off the EL driving circuit 37 from the DC electric power source 36. Thus, the EL driving circuit 37 stops the driving operation for the EL light illuminating panel 14.

When the tuning operation is finished, the vertical synchronizing signal V.SYNC is applied to the signal line 31 again, and the result is that, as above-mentioned, the driving operation of the EL light illuminating panel 14 is begun by the EL driving circuit 37. That is, while the television receiver is receiving television signals, the EL light illuminating panel 14 is driven. While no television signals are received, for example, during the tuning operation, the panel 14 is not driven which saves power consumption.

Figure 11:
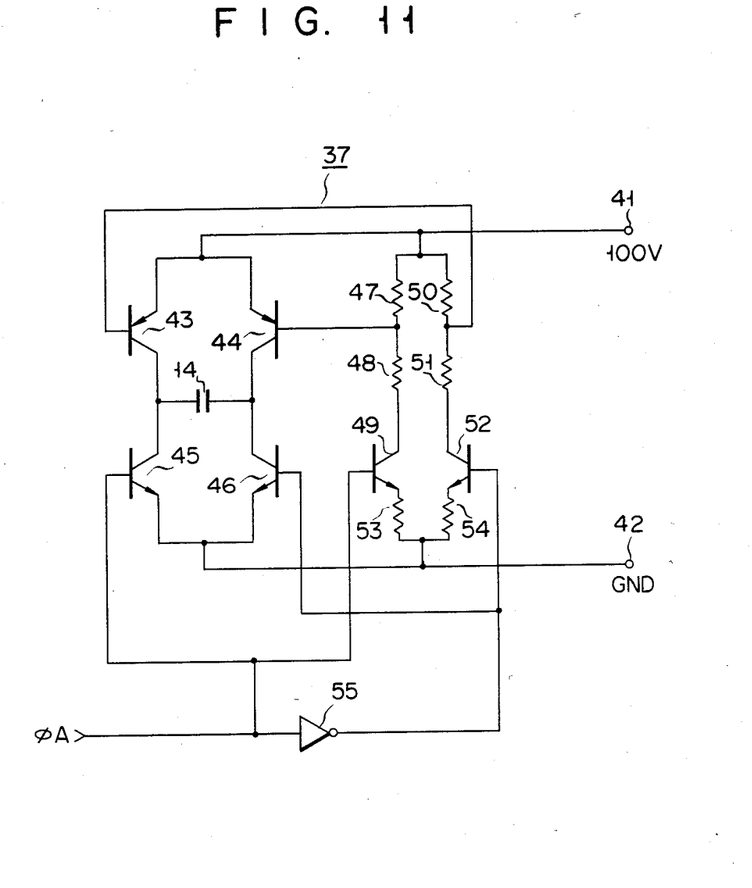
FIG. 11 is a circuit diagram showing one of the embodiments of the driving circuit of the EL light illuminating panel shown in FIG. 10.

Next, referring to FIG. 11, the EL driving circuit 37 will be explained in detail. In FIG. 11, are terminals 41 and 42 of the electric power source, and a positive voltage of 100 V is supplied to one terminal, 41 from the DC power source through the switching element 35, and the other terminal 42 is grounded.

Between the terminals 41 and 42, there are provided P-channel type transistors 43 and 44 and N-channel type transistors 45 and 46 which are connected with one another to form a bridge network. That is, the terminal 41 is connected to emitters of the transistors 43 and 44, and each of the collectors thereof is connected to the other terminal 42 through a collector emitter of respective transistors 45 and 46. Between collectors of the transistors 43 and 45 commonly connected with each other and those of the transistors 44 and 46, also commonly connected with each other, the EL light illuminating panel 14 is connected.

Further, the terminal 41 is connected to a collector of an N-channel type transistor 49 through resistors 47 and 48 and, at the same time, it is connected to a collector of an N-channel type transistor 52 through resistors 50 and 51. Each of the emitters of the transistors 49 and 52 is connected to the terminal 42 via resistors 53 and 54, respectively. Clock pulse $\phi_A$ of 400 Hz is, for example, input to the bases of transistors 45 and 49, and also, through an inverter 55, to the bases of the transistors 46 and 52. The connecting point of the resistors 47 and 48 is connected to the base of the transistor 44, and the connecting point of the resistors 50 and 51 is connected to the base of the transistor 43.

In the EL driving circuit 37 constructed as described above, when the clock pulse $\phi_A$ is in the high level ("1"), the transistors 45 and 49 turn ON, and the transistor 46 and 52 turn OFF. When the transistor 49 turns ON, a voltage drop occurs in the resistor 47 by the collector current of the transistor 49, which causes the base of the transistor 44 to bias in the forward direction so as to turn on the transistor 44.

On the other hand, when the transistor 52 is "OFF", the voltage (+100 V) of the electric power source is directly supplied thereto through a resistor 50. Accordingly, the transistor 43 turns OFF because the base and emitter become the same voltage. Thus, when the clock pulse $\phi_A$ is high, the transistors 45 and 44 turn ON, and the transistors 46 and 43 turn OFF. Then, in the EL light illuminating panel 14, the side to which the transistor 44 is connected is +100 V and the other side becomes ground level through the terminal 42.

In addition, when clock pulse $\phi_A$ is at a low level ("0"), the transistors 45 and 49 turn off, and the transistors 46 and 52 also turn off. As the result, contrary to the above, a voltage drop occurs in the resistor 50 to bias the transistor 43 in the forward direction. Further, the transistor 44 is still fed a voltage of +100 V through the resistor 47, so that the base and emitter thereof become an equal voltage and it turns OFF. Accordingly, the EL light illuminating panel 14 assumes a voltage of +100 V at the side connected with the transistor 43 and the voltage of the other side is at ground level.

As described above, the polarity of voltage to apply to the EL light illuminating panel 14 is reversed in synchronism with both the high and low levels of the clock pulse $\phi_A$. Hence, the EL illuminating panel 14 is driven by AC current.

Figure 12:
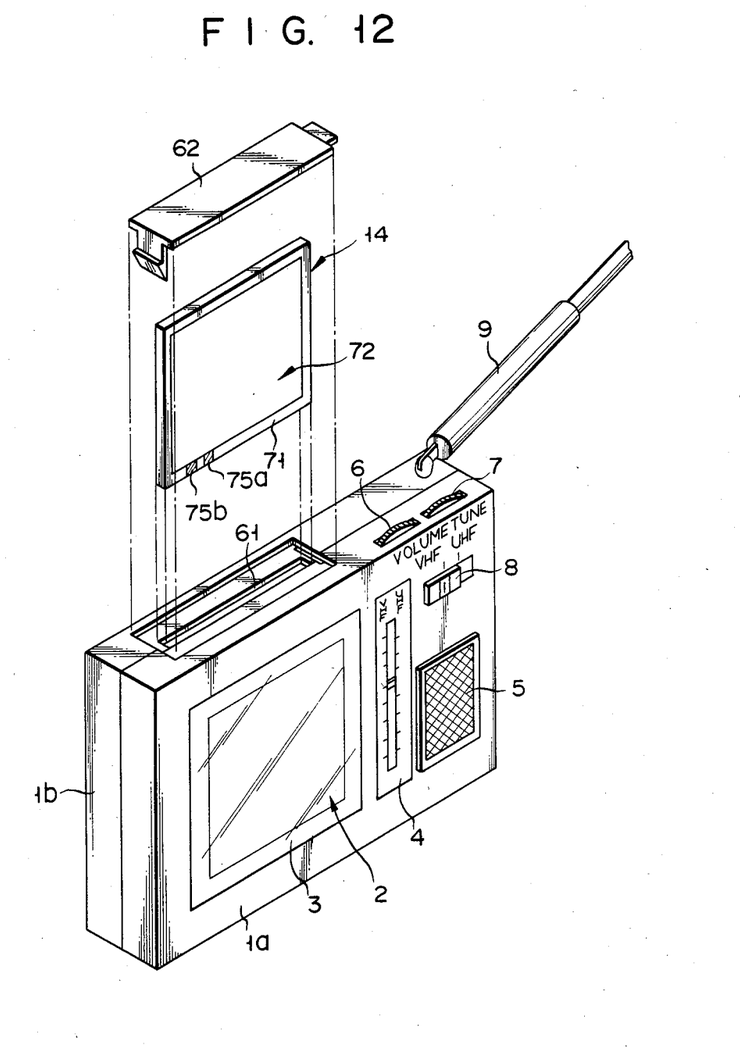
FIG. 12 is an external perspective view of another embodiment in which the EL light illuminating panel is detachably fitted to the case of the liquid crystal television receiver according to the present invention.

Next, another embodiment of the present invention will be explained with reference to FIGS. 12 to 15. Here, the same reference numbers are given to the same members or parts shown in the previous embodiment. In the embodiment shown in FIGS. 12 to 15 the EL light illuminating panel 14 is detachably mounted in the case so as to be exchangeable, while in the first embodiment the EL light illuminating panel 14 is fixedly mounted. As shown in FIG. 12, the cases 1a and 1b each have an opening 61 cut in the top wall. Through the opening 61 the light illuminating panel 14 is inserted into the case 1a or 1b. The cases 1a and 1b each have a lid 62 for closing the opening 61.

Figures 13, 14:
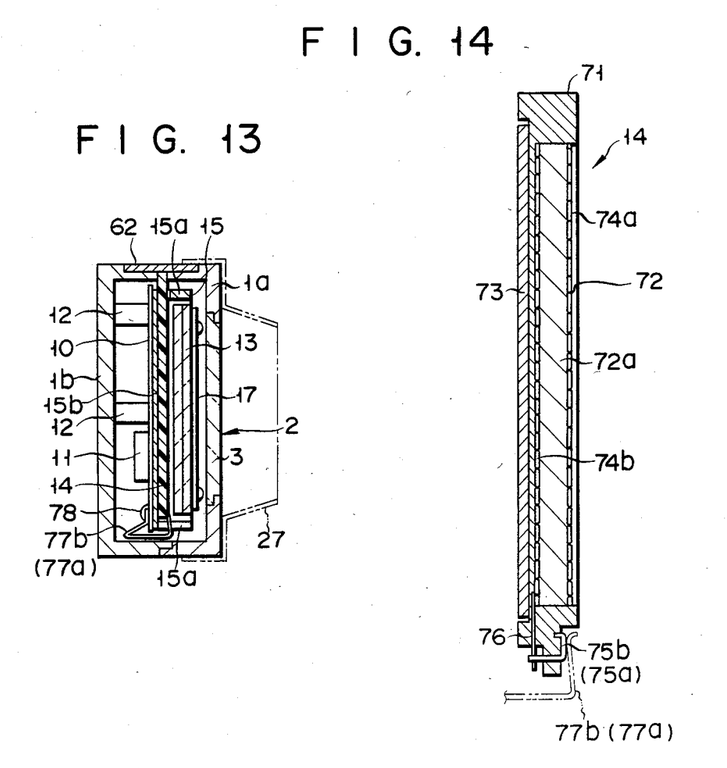
FIG. 13 is a sectional view showing a state in which the EL light illuminating panel shown in FIG. 11 is equipped inside the case.
FIG. 14 is a sectional view showing construction of the EL light illuminating panel.
Figure 15:
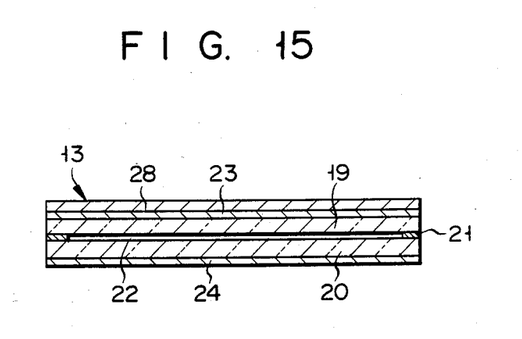
FIG. 15 is a sectional view of another embodiment of the EL light illuminating panel.

The EL light illuminating panel 14 is inserted from the opening 61 into the cases 1a and 1b and set, as shown in FIG. 13, to face the reverse side of the liquid crystal display panel 13. Further, if necessary, it is adapted to be outwardly extractable. The EL light illuminating panel 14 is, as shown in FIG. 14, a panel filled with an EL light illuminating layer over the whole surface of a flat plate-like housing 71 which is formed by concaving the surface of the panel except for its periphery, and on the reverse side of the housing 71 there is mounted a total reflection plate 73.

An EL light illuminating layer 72 is a condensor having a construction which holds a dielectric layer 72a containg phosphor which emits fluorescent light when a predetermined voltage is applied between a transparent plate 74a whose front surface is an electrode and a metallic plate 74b whose reverse surface is an electrode, and when an alternating current voltage is applied between the electrode plates 74a and 74b, the phosphor contained therein emits light.

At the front surface of the EL light illuminating panel 14 which is to be inserted into the case 1a, 1b, a pair of terminals 75a and 75b are mounted, and the terminal 75a is connected to the front surface electrode plate 74a with a lead line (not shown), and the other terminal 75b is connected to the reverse surface electrode 74b through a lead line 76.

In FIG. 13, each of spring contacts 77a and 77b contacts respective terminals 75a and 75b of the EL lighting illuminating panel 14. Each of the basic edge portions thereof is secured to a light illuminating panel connecting terminal (not shown) formed on the reverse side of the circuit substrate 10 by soldering, and is bent so as to detour the periphery of the circuit substrate 10, and adapted to contact the terminals 75a and 75b from the front surface side thereof.

The EL light illuminating panel 14 inserted into the case 1a and 1b from the EL light illuminating panel insertion opening 61 is adapted to be inserted into a predetermined position slidingly on the surface of the flat-plate portion 15b of the display supporting frame 15. The inserted end of the EL light illuminating panel 14 is inserted into the inside of the case by elastically deforming the springy contacting pieces 77a and 77b outwardly, and then faces the reverse side of the liquid crystal panel 13 and is elastically held at the flat-plate portion 15b of the display supporting frame 15 by the spring contacts 77a and 77b. Further, the outer end portion of the EL light illuminating panel 14 is, as shown in FIG. 13, to be held at the light illuminating panel insertion opening 61. That is, the spring contacts 77a and 77b connect not only the terminals 75a and 75b of the EL light illuminating panel 14 and the light illuminating panel driving circuit on the circuit substrate 10, but also serve as fixing members for fixing the inserting edge portion of the EL light illuminating panel 14.

Because of the above-mentioned construction, the EL light illuminating panel 14 can be detachably mounted. Accordingly, it can be easily exchanged for another EL light illuminating panel which emits various colored lights.

In the embodiment described above, a single color display is achieved by replacing the EL light illuminating panel 14 with a colored illuminating panel. Nonetheless, a single color display can be effected by replacing the polarizer 23 with a color polarizer or by mounting the color filter 28 on the liquid crystal display 13, even if the panel 14 is a non-colored illuminating panel. Further it is possible to accomplish a single color display by synthesizing colored light from the panel 14 and colored light from the color polarizer and/or the color filter 28. The following table shows several color picture colors obtained by compositions of colored light from the EL light illuminating panel 14, colored light from the color polarizer and colored light from the color filter 28.

TABLE

| Light Illuminating Panel | Color Polarizer | Color Filter | Picture |
|---|---|---|---|
| Blue | Yellow | — | Green |
| Blue | — | Yellow | Green |
| Green | Red | — | Yellow |
| Green | — | Red | Yellow |
| White | Blue | Yellow | Green |
| White | Green | Red | Yellow |

What we claim is:
1. A liquid crystal television receiver, comprising:
a television circuit;
a liquid crystal display panel coupled to said television circuit for producing a television picture image on a front side thereof;

light illuminating means facing a reverse side of said liquid crystal display panel opposite said front side for emitting light through and out of the front side of said panel;

a tuning detection circuit for detecting a tuned state wherein said television circuit is tuned to a television signal wave;

a driving circuit adapted to drive said light illuminating means to permit light emission only when said tuning detection circuit detects said tuned state; and a case for holding said television circuit, liquid crystal display panel, light illuminating means, tuning detection circuit and driving circuit in operative relation therein.

2. A liquid crystal television receiver according to claim 1, in which said light illuminating means is arranged to be driven in a push-pull fashion.

3. A liquid crystal television receiver according to claim 1, in which said light illuminating means is of an electroluminescent type.

4. A liquid crystal television receiver according to claim 1, including a layer of coloring light on at least one of the front and reverse sides of said liquid crystal display panel.

5. A liquid crystal television receiver according to claim 4, in which said layer of coloring light is formed by a color polarizer.

6. A liquid crystal television receiver according to claim 4, in which said layer of coloring light is formed by a color filter.

7. A liquid crystal television receiver according to claim 1, in which said light illuminating means is a color light illuminating panel.

8. A liquid crystal television receiver according to claim 1, in which said light illuminating means is an electroluminescent color light illuminating panel.

9. A liquid crystal television receiver according to claim 1, in which said light illuminating means is a color light illuminating panel and said liquid crystal display panel includes at least one of a color polarizer and a color filter.

10. A liquid crystal television receiver according to claim 1, wherein said light illuminating means comprises an electroluminescent panel, and comprising a half mirror disposed between said liquid crystal display panel and said electroluminescent panel, and said case holds said half mirror in operative relation therein.

11. A liquid crystal television receiver according to claim 1, wherein said receiver further includes a connecting circuit adapted to make an electrical connection between said illuminating means and said driving circuit when said light illuminating means is attached to said connecting circuit; said light illuminating means is detachably attached to said liquid crystal display panel; and said case has an opening for permitting attachment and detachment of said light illuminating means and also holds said connecting circuit.

* * * * *